(12) United States Patent
Hsu et al.

(10) Patent No.: US 12,012,506 B1
(45) Date of Patent: Jun. 18, 2024

(54) ANTISTATIC PLASTIC AND METHOD OF FORMING THE SAME

(71) Applicant: INDUSTRIAL TECHNOLOGY RESEARCH INSTITUTE, Hsinchu (TW)

(72) Inventors: Chin-Shang Hsu, Hsinchu (TW); Pang-Hung Liu, Hsinchu (TW); Nien-Tsu Lee, Taipei (TW); Chien-Wei Lu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 18/171,404

(22) Filed: Feb. 20, 2023

(30) Foreign Application Priority Data

Dec. 21, 2022 (TW) .................................. 111149115

(51) Int. Cl.

| | | |
|---|---|---|
| *C08L 23/08* | (2006.01) | |
| *B09B 3/35* | (2022.01) | |
| *B29B 17/02* | (2006.01) | |
| *B29B 17/04* | (2006.01) | |
| *C08J 3/20* | (2006.01) | |
| *C08J 5/18* | (2006.01) | |
| *C08K 3/08* | (2006.01) | |
| *B09B 101/15* | (2022.01) | |
| *B29K 31/00* | (2006.01) | |
| *B29K 67/00* | (2006.01) | |
| *B29K 505/14* | (2006.01) | |
| *B29K 507/00* | (2006.01) | |
| *B29L 31/34* | (2006.01) | |
| *C08K 3/02* | (2006.01) | |

(52) U.S. Cl.
CPC ............ *C08L 23/0853* (2013.01); *B09B 3/35* (2022.01); *B29B 17/02* (2013.01); *B29B 17/04* (2013.01); *C08J 3/203* (2013.01); *C08J 5/18* (2013.01); *C08K 3/08* (2013.01); *B09B 2101/15* (2022.01); *B29B 2017/042* (2013.01); *B29K 2031/04* (2013.01); *B29K 2067/003* (2013.01); *B29K 2505/14* (2013.01); *B29K 2507/00* (2013.01); *B29K 2995/0005* (2013.01); *B29L 2031/34* (2013.01); *C08J 2323/08* (2013.01); *C08J 2427/12* (2013.01); *C08J 2467/02* (2013.01); *C08K 2003/023* (2013.01); *C08K 2003/0806* (2013.01); *C08K 2201/001* (2013.01); *C08K 2201/005* (2013.01); *C08L 2201/04* (2013.01); *C08L 2205/03* (2013.01)

(58) Field of Classification Search
CPC .................................................... C08L 23/0853
See application file for complete search history.

(56) References Cited

U.S. PATENT DOCUMENTS

| | | | |
|---|---|---|---|
| 10,236,514 | B2 | 3/2019 | Chen et al. |
| 2007/0084996 | A1 | 4/2007 | Li et al. |
| 2011/0183563 | A1 | 7/2011 | Ochi et al. |
| 2020/0331178 | A1 | 10/2020 | Lin et al. |
| 2021/0305450 | A1 | 9/2021 | Sasai et al. |
| 2022/0015236 | A1 | 1/2022 | Huang et al. |
| 2023/0299371 | A1* | 9/2023 | Haufe ............... H01M 4/134 429/231.95 |

OTHER PUBLICATIONS

Taiwanese Notice of Allowance and Search Report for Taiwanese Application No. 111149115, dated Aug. 8, 2023.

* cited by examiner

*Primary Examiner* — William D Young
(74) *Attorney, Agent, or Firm* — Birch, Stewart, Kolasch & Birch, LLP

(57) ABSTRACT

A method of forming an antistatic plastic includes providing a mixture containing 10 parts by weight of crystalline silicon particles, 1 to 30 parts by weight of an encapsulant, and 0.5 to 25 parts by weight of a backsheet material. The mixture is compounded to form an antistatic plastic, wherein the encapsulant is different from the backsheet material.

17 Claims, No Drawings

ANTISTATIC PLASTIC AND METHOD OF FORMING THE SAME

CROSS REFERENCE TO RELATED APPLICATIONS

The present application is based on, and claims priority from, Taiwan Application Serial Number 111149115, filed on Dec. 21, 2022, the disclosure of which is hereby incorporated by reference herein in its entirety.

TECHNICAL FIELD

The technical field relates to an antistatic plastic, and in particular it relates to a method of recycling the silicon wafer-based photovoltaic module to produce the antistatic plastic.

BACKGROUND

As the demand for renewable energy soar, the usage and waste amounts of silicon wafer-based photovoltaic modules also increases. The conventional methods for recycling silicon wafer-based photovoltaic modules are mainly physical methods, high-temperature methods, and solvent methods. The physical methods break or crush the module and then recycle the broken/shattered glass and silicon waste. The encapsulant and the backsheet plastic parts are disposed of in landfill. The high-temperature methods burn the encapsulant and the backsheet plastic at a high temperature, and recycle the inorganic materials such as aluminum, silicon, copper, silver, glass, and the like. The high-temperature methods not only consume a lot of energy but also produce exhaust gas. If the backsheet contain fluorine, the combustion gas may deplete the ozone layer. The solvent methods dissolve the encapsulant with a solvent to recycle the cracked glass and the silicon waste, which produce a waste solvent. In addition, the economic value of the recycled product, such as waste silicon material or glass, may be lower than the recycling cost.

Accordingly, a novel method is called for to recycle silicon wafer-based photovoltaic modules to produce a recycled product with a high value.

SUMMARY

One embodiment of the disclosure provides a method of forming an antistatic plastic, including: providing a mixture containing 10 parts by weight of crystalline silicon particles, 1 to 30 parts by weight of an encapsulant, and 0.5 to 25 parts by weight of a backsheet material; and compounding the mixture to form an antistatic plastic, wherein the encapsulant is different from the backsheet material.

One embodiment of the disclosure provides an antistatic plastic, including 10 parts by weight of crystalline silicon particles; 1 to 30 parts by weight of an encapsulant; and 0.5 to 25 parts by weight of a backsheet material, wherein the encapsulant is different from the backsheet material.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a method of forming an antistatic plastic, which includes providing a mixture containing 10 parts by weight of crystalline silicon particles, 1 to 30 parts by weight (such as 1 to 25 parts by weight but being not limited thereto) of an encapsulant, and 0.5 to 25 parts by weight (such as 0.5 to 20 parts by weight or 0.5 to 15 parts by weight, but being not limited thereto) of a backsheet material; and compounding the mixture to form an antistatic plastic, wherein the encapsulant is different from the backsheet material. If the amount of the encapsulant is too low, it cannot assist the crystalline silicon particles be evenly dispersed in the mixture. If the amount of the encapsulant is too high, the blending effect of the mixture will be poor. If the amount of the backsheet material is too low, the compounded mixture will have a poor mechanical strength. If the amount of the backsheet material is too high, the compounded mixture will have a high surface resistivity.

In some embodiments, the step of providing the mixture includes recycling a silicon wafer-based photovoltaic module containing a glass cover, a silicon wafer, an encapsulant layer, and a backsheet; removing the glass cover from the silicon wafer-based photovoltaic module; and crushing the silicon wafer, the encapsulant layer, and the backsheet to form the mixture. It should be understood that the silicon wafer-based photovoltaic module may include other elements such as aluminum frame, bracket, junction box, and the like. The glass cover (and the other elements, if existing) is removed from the silicon wafer-based photovoltaic module, and the silicon wafer, the encapsulant layer, and the backsheet are crushed to form a mixture, In general, the mixture may include a small amount of impurity (<1 wt %) such as metal (from the conductive paste or wiring). It should be understood that the weight ratio of crystalline silicon particles to the encapsulant to the backsheet material in the mixture is determined by the weight ratio of the silicon wafer to the encapsulant to the backsheet in the silicon wafer-based photovoltaic module. In addition, if the weight ratio of the silicon wafer to the encapsulant to the backsheet in the silicon wafer-based photovoltaic module does not meet the required content ratio of the antistatic plastic, then additional crystalline silicon particles, encapsulant, or backsheet material can be added to the mixture for adjusting the content ratio of the antistatic plastic. Alternatively, a mixture of an appropriate ratio of the crystalline silicon particles to the encapsulant to the backsheet material can be directly compounded to form the antistatic plastic, which omits the step of recycling and crushing the silicon wafer, the encapsulant layer, and the backsheet of the silicon wafer-based photovoltaic module.

In some embodiments, the crystalline silicon particles have a particle size of 0.0001 mm to 1 mm. The particle size of the crystalline silicon particles is determined by the degree of crushing the silicon wafer. If the size of the crystalline silicon particles is too small, the cost of crushing process will be increased without any obvious benefits. If the size of the crystalline silicon particles is too large, the processing efficiency of compounding the mixture will be poor.

In some embodiments, the encapsulant includes ethylene vinyl acetate copolymer (EVA), thermoplastic polyolefin (TPO), polyvinyl butyral (PVB), or a combination thereof. In some embodiments, the backsheet material comprises polyethylene terephthalate (PET), polyvinyl fluoride (PVF), polyvinylidene fluoride (PVDF), polyamide (PA), ethylene vinyl acetate copolymer (EVA), tetrafluoroethylene-hexafluoropropylene-vinylidene fluoride terpolymer (THV), ethylene chlorotrifluoroethylene copolymer (ECTFE), polyethylene (PE), or a combination thereof. Note that the encapsulant is different from the backsheet material, such that ethylene vinyl acetate copolymer will not simultaneously serve as the encapsulant and the backsheet material. For example, if the encapsulant utilizes ethylene vinyl acetate copolymer, the backsheet material will utilize another applicable material such as polyethylene terephthalate, fluorine-containing polymer, or a combination thereof. If the backsheet material utilizes ethylene vinyl acetate copolymer, the encapsulant will utilize another applicable material such as thermoplastic polyolefin.

In some embodiments, the step of compounding the mixture of the crystalline silicon particles, the encapsulant, and the backsheet material further includes adding 1 to 100 parts by weight (such as 10 to 90 parts by weight, 15 to 75 parts by weight, or 20 to 50 parts by weight, but being not limited thereto) of an engineering plastic, 0.1 to 30 parts by weight (such as 0.1 to 20 parts by weight, 0.1 to 10 parts by weight, 0.1 to 5 parts by weight, or 0.1 to 2 parts by weight, but being not limited thereto) of an additive agent, or a combination thereof to the mixture, wherein the engineering plastic is different from the encapsulant, and the engineering plastic is different from the backsheet material. The engineering plastic may further improve the processability of the antistatic plastic, and the additive agent may further adjust the properties (e.g. sheet resistance) of the antistatic plastic. If the amount of the engineering plastic is too low, the effect will be same as that without adding the engineering plastic. If the amount of the engineering plastic is too high, it may degrade the antistatic effect of the antistatic plastic. If the amount of the additive agent is too low, the effect will be same as that without adding the additive agent. If the amount of the additive agent is too high, it may degrade the properties (e.g. tensile strength) of the antistatic plastic.

In some embodiments, the engineering plastic includes polycarbonate (PC), polypropylene (PP), polyethylene terephthalate (PET), polybutylene terephthalate (PBT), nylon, acrylonitrile-butadiene-styrene copolymer (ABS), polyethylene (PE), polyimide (PI), polyether ether ketone (PEEK), polyoxymethylene (POM), polymethyl methacrylate (PMMA), thermoplastic rubber elastomer (TPE), or a combination thereof. In some embodiments, the additive agent includes conductive additive agent, modifier, lubricant, antioxidant, thermal stabilizer, reinforcing agent, or a combination thereof. For example, the conductive additive agent includes metal powder, metal fiber, conductive carbon black, conductive carbon fiber, graphene, carbon nanotube, or a combination thereof.

In some embodiments, the method further includes thermally pressing the antistatic plastic to form a plate, and the plate has a surface resistivity of $10^6$ ohm/sq to $10^{14}$ ohm/sq. If the surface resistivity of the plate is too low or too high, the plate will not be suitable to serve as an antistatic object.

Compared to the conventional skills, the disclosure transfers the recycled silicon wafer-based photovoltaic modules to the antistatic plastic with higher value. In addition, the method does not need additional steps to separate the silicon particles (from the crushed silicon wafer), the encapsulant (from the crushed encapsulant layer) and the backsheet (from the crushed backsheet), thereby saving the separating cost. On the other hand, an appropriate amount of engineering plastic and additive agent can be added to improve the processability and the properties of the antistatic plastic.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In following Examples, the surface resistivity of the plate was measured according to the standard EOS/ESD-S11.11.

Example 1

After removing the glass and junction boxes, a batch of waste silicon wafer-based photovoltaic modules were crushed to obtain A1 material containing 25.4 parts by weight of crystalline silicon particles (from the silicon wafer, having a particle size of 0.01 mm to 1 mm), 48.1 parts by weight of encapsulant such as ethylene vinyl acetate copolymer (EVA, from the encapsulant layer), 26.30 parts by weight of backsheet material such as polyethylene terephthalate (PET) and fluorine-containing plastic (from the backsheet), and 0.2 parts by weight of metal such as silver (from the conductive paste or wiring). A1 material was loaded into a twin screw compounder and then compounded at 250° C. for 3 to 5 minutes to form a composite. The composite was thermally pressed to form a plate to facilitate the measurement of its surface resistivity ($7*10^{11}$ ohm/sq to $5*10^{12}$ ohm/sq).

Example 2

After removing the glass and junction boxes, another batch of waste silicon wafer-based photovoltaic modules were crushed to obtain A2 material containing 22.68 parts by weight of crystalline silicon particles (from the silicon wafer, having a particle size of 0.001 mm to 0.05 mm), 48.76 parts by weight of encapsulant such as EVA (from the encapsulant layer), 28.35 parts by weight of backsheet material such as PET and fluorine-containing plastic (from the backsheet), and 0.2 parts by weight of metal such as silver (from the trace). A2 material was put into a twin screw compounder and then compounded at 250° C. for 2 to 3 minutes to form a composite. The composite was thermally pressed to form a plate to facilitate the measurement of its surface resistivity ($10^{12}$ ohm/sq to $10^{13}$ ohm/sq).

Example 3

After removing the glass and junction boxes, another batch of waste silicon wafer-based photovoltaic modules were crushed to obtain A3 material containing 22.10 parts by weight of crystalline silicon particles (from the silicon wafer, having a particle size of 0.0001 mm to 0.01 mm), 49.6 parts by weight of encapsulant such as EVA (from the encapsulant layer), 28 parts by weight of backsheet material such as PET and fluorine-containing plastic (from the backsheet), and 0.3 parts by weight of metal such as silver (from the conductive paste or wiring). A3 material was loaded into a twin screw compounder and then compounded at 250° C. for 2 to 3 minutes to form a composite. The composite was thermally pressed to form a plate to facilitate the measurement of its surface resistivity ($10^{12}$ ohm/sq to $10^{13}$ ohm/sq).

Comparative Example 1

The commercially available engineering plastic such as polycarbonate B1 (Makrolon 2805 commercially available from Bayer) was thermally pressed to form a plate to facilitate the measurement of its surface resistivity (>$10^{14}$ ohm/sq).

Example 4

A1 material was sieved to obtain crystalline silicon particles C1 with a small amount of plastic adhered thereon (the crystalline silicon particles occupied at least 98 wt %, and the crystalline silicon particles had a particle size of 0.01 mm to 0.1 mm). 87 parts by weight of A1 material and 13 parts by weight of the crystalline silicon particles C1 were mixed and then loaded into a twin screw compounder to be compounded at 250° C. for 2 to 3 minutes to form a composite containing 35.1 parts by weight of the crystalline silicon particles (from the silicon wafer, having a particle size of 0.01 mm to 0.1 mm), 41.85 parts by weight of encapsulant such as ethylene vinyl acetate copolymer (EVA, from the encapsulant layer), 22.88 parts by weight of backsheet material such as polyethylene terephthalate (PET) and fluorine-containing plastic (from the backsheet), and 0.17 parts by weight of metal such as silver (from the conductive paste or wiring). The composite was thermally pressed to form a plate to facilitate the measurement of its surface resistivity ($10^{11}$ ohm/sq to $10^{12}$ ohm/sq).

Example 5

63 parts by weight of A1 material and 37 parts by weight of the crystalline silicon particles C1 were mixed and then loaded into a twin screw compounder to be compounded at 250° C. for 2 to 3 minutes to form a composite containing 53.0 parts by weight of the crystalline silicon particles (from the silicon wafer, having a particle size of 0.01 mm to 0.1 mm), 30.30 parts by weight of encapsulant such as ethylene vinyl acetate copolymer (EVA, from the encapsulant layer), 16.57 parts by weight of backsheet material such as polyethylene terephthalate (PET) and fluorine-containing plastic (from the backsheet), and 0.13 parts by weight of metal such as silver (from the conductive paste or wiring). The composite was thermally pressed to form a plate to facilitate the measurement of its surface resistivity ($10^9$ ohm/sq to $10^{10}$ ohm/sq).

Example 6

37 parts by weight of A1 material and 63 parts by weight of the crystalline silicon particles C1 were mixed and then loaded into a twin screw compounder to be compounded at 250° C. for 2 to 3 minutes to form a composite containing 72.4 parts by weight of the crystalline silicon particles (from the silicon wafer, having a particle size of 0.01 mm to 0.1 mm), 17.80 parts by weight of encapsulant such as ethylene vinyl acetate copolymer (EVA, from the encapsulant layer), 9.73 parts by weight of backsheet material such as polyethylene terephthalate (PET) and fluorine-containing plastic (from the backsheet), and 0.07 parts by weight of metal such as silver (from the conductive paste or wiring). The composite was thermally pressed to form a plate to facilitate the measurement of its surface resistivity ($10^8$ ohm/sq to $10^9$ ohm/sq).

Example 7

20 parts by weight of A1 material and 80 parts by weight of the crystalline silicon particles C1 were mixed and then loaded into a twin screw compounder to be compounded at 250° C. for 2 to 3 minutes to form a composite containing 85.08 parts by weight of the crystalline silicon particles (from the silicon wafer, having a particle size of 0.01 mm to 0.1 mm), 9.62 parts by weight of encapsulant such as ethylene vinyl acetate copolymer (EVA, from the encapsulant layer), 5.26 parts by weight of backsheet material such as polyethylene terephthalate (PET) and fluorine-containing plastic (from the backsheet), and 0.04 parts by weight of metal such as silver (from the conductive paste or wiring). The composite was thermally pressed to form a plate to facilitate the measurement of its surface resistivity ($10^7$ ohm/sq to $10^8$ ohm/sq).

Example 8

65 parts by weight of A2 material and 35 parts by weight of the polycarbonate B1 were mixed and then loaded into a twin screw compounder to be compounded at 250° C. for 2 to 3 minutes to form a composite containing 14.74 parts by weight of the crystalline silicon particles (from the silicon wafer, having a particle size of 0.001 mm to 0.05 mm), 31.70 parts by weight of encapsulant such as ethylene vinyl acetate copolymer (EVA, from the encapsulant layer), 18.43 parts by weight of backsheet material such as polyethylene terephthalate (PET) and fluorine-containing plastic (from the backsheet), 35 parts by weight of the polycarbonate, and 0.13 parts by weight of metal such as silver (from the conductive paste or wiring). The composite was thermally pressed to form a plate to facilitate the measurement of its surface resistivity ($10^{13}$ ohm/sq to $10^{14}$ ohm/sq).

Example 9

64.8 parts by weight of A2 material, 34.9 parts by weight of the polycarbonate B1, and 0.3 parts by weight of conductive carbon black C2 (XE-2b commercially available from Degauss) were mixed and then loaded into a twin screw compounder to be compounded at 250° C. for 2 to 3 minutes to form a composite containing 14.74 parts by weight of the crystalline silicon particles (from the silicon wafer, having a particle size of 0.001 mm to 0.05 mm), 31.60 parts by weight of encapsulant such as ethylene vinyl acetate copolymer (EVA, from the encapsulant layer), 18.37 parts by weight of backsheet material such as polyethylene terephthalate (PET) and fluorine-containing plastic (from the backsheet), 34.9 parts by weight of the polycarbonate, 0.30 parts by weight of conductive carbon black, and 0.13 parts by weight of metal such as silver (from the conductive paste or wiring). The composite was thermally pressed to form a plate to facilitate the measurement of its surface resistivity ($10^7$ ohm/sq to $10^8$ ohm/sq).

Example 10

64.7 parts by weight of A2 material, 34.8 parts by weight of the polycarbonate B1, and 0.5 parts by weight of conductive carbon black C2 were mixed and then loaded into a twin screw compounder to be compounded at 250° C. for 2 to 3 minutes to form a composite containing 14.67 parts by weight of the crystalline silicon particles (from the silicon wafer, having a particle size of 0.001 mm to 0.05 mm), 31.55 parts by weight of encapsulant such as ethylene vinyl acetate copolymer (EVA, from the encapsulant layer), 18.34 parts by weight of backsheet material such as polyethylene terephthalate (PET) and fluorine-containing plastic (from the backsheet), 34.80 parts by weight of the polycarbonate, 0.50 parts by weight of conductive carbon black, and 0.13 parts by weight of metal such as silver (from the conductive paste or wiring). The composite was thermally pressed to form a plate to facilitate the measurement of its surface resistivity ($10^6$ ohm/sq to $10^7$ ohm/sq).

Example 11

64.5 parts by weight of A2 material, 34.7 parts by weight of the polycarbonate B1, and 0.8 parts by weight of the conductive carbon black C2 were mixed and then loaded into a twin screw compounder to be compounded at 250° C. for 2 to 3 minutes to form a composite containing 14.63 parts by weight of the crystalline silicon particles (from the silicon wafer, having a particle size of 0.001 mm to 0.05 mm), 31.45 parts by weight of encapsulant such as ethylene vinyl acetate copolymer (EVA, from the encapsulant layer), 18.29 parts by weight of backsheet material such as polyethylene terephthalate (PET) and fluorine-containing plastic (from the backsheet), 34.70 parts by weight of the polycarbonate, 0.80 parts by weight of conductive carbon black, and 0.13 parts by weight of metal such as silver (from the conductive paste or wiring). The composite was thermally pressed to form a plate to facilitate the measurement of its surface resistivity ($10^5$ ohm/sq to $10^6$ ohm/sq).

Example 12

64.2 parts by weight of A2 material, 34.6 parts by weight of the polycarbonate B1, and 1.2 parts by weight of the conductive carbon black C2 were mixed and then loaded into a twin screw compounder to be compounded at 250° C. for 2 to 3 minutes to form a composite containing 14.56 parts by weight of the crystalline silicon particles (from the silicon wafer, having a particle size of 0.001 mm to 0.05 mm), 31.31 parts by weight of encapsulant such as ethylene vinyl acetate copolymer (EVA, from the encapsulant layer), 18.20 parts by weight of backsheet material such as polyethylene terephthalate (PET) and fluorine-containing plastic (from the backsheet), 34.60 parts by weight of the polycarbonate, 1.20 parts by weight of conductive carbon black, and 0.13 parts by weight of metal such as silver (from the conductive paste or wiring). The composite was thermally pressed to form a plate to facilitate the measurement of its surface resistivity ($10^4$ ohm/sq to $10^5$ ohm/sq).

Example 13

98.7 parts by weight of A3 material and 1.3 parts by weight of the conductive carbon black C2 were mixed and then loaded into a twin screw compounder to be compounded at 250° C. for 2 to 3 minutes to form a composite containing 21.81 parts by weight of the crystalline silicon particles (from the silicon wafer, having a particle size of 0.0001 mm to 0.01 mm), 48.96 parts by weight of encapsulant such as ethylene vinyl acetate copolymer (EVA, from the encapsulant layer), 27.64 parts by weight of backsheet material such as polyethylene terephthalate (PET) and fluorine-containing plastic (from the backsheet), 1.30 parts by weight of conductive carbon black, and 0.30 parts by weight of metal such as silver (from the conductive paste or wiring). The composite was thermally pressed to form a plate to facilitate the measurement of its surface resistivity ($10^4$ ohm/sq to $10^6$ ohm/sq).

Example 14

49.35 parts by weight of A3 material, 49.35 parts by weight of the polycarbonate B1, and 1.3 parts by weight of the conductive carbon black C2 were mixed and then loaded into a twin screw compounder to be compounded at 250° C. for 2 to 3 minutes to form a composite containing 10.91 parts by weight of the crystalline silicon particles (from the silicon wafer, having a particle size of 0.0001 mm to 0.01 mm), 24.48 parts by weight of encapsulant such as ethylene vinyl acetate copolymer (EVA, from the encapsulant layer), 13.82 parts by weight of backsheet material such as polyethylene terephthalate (PET) and fluorine-containing plastic (from the backsheet), 49.35 parts by weight of the polycarbonate, 1.30 parts by weight of conductive carbon black, and 0.15 parts by weight of metal such as silver (from the conductive paste or wiring). The composite was thermally pressed to form a plate to facilitate the measurement of its surface resistivity ($10^6$ ohm/sq to $10^8$ ohm/sq).

Comparative Example 2

98.7 parts by weight of the polycarbonate B1 and 1.3 parts by weight of the conductive carbon black C2 were mixed and then loaded into a twin screw compounder to be compounded at 250° C. for 2 to 3 minutes to form a composite. The composite was thermally pressed to form a plate to facilitate the measurement of its surface resistivity ($>10^{13}$ ohm/sq).

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method of forming an antistatic plastic, comprising:
   providing a mixture containing 10 parts by weight of crystalline silicon particles, 1 to 30 parts by weight of an encapsulant, and 0.5 to 25 parts by weight of a backsheet material;
   compounding the mixture to form an antistatic plastic; and
   thermally pressing the antistatic plastic to form a plate, and the plate has a surface resistivity of $10^6$ ohm/sq to $10^{14}$ ohm/sq,
   wherein the encapsulant is different from the backsheet material.

2. The method as claimed in claim 1, wherein the step of providing the mixture comprises:
   recycling a silicon wafer-based photovoltaic module containing a glass cover, a silicon wafer, an encapsulant layer, and a backsheet;
   removing the glass cover from the silicon wafer-based photovoltaic module; and
   crushing the silicon wafer, the encapsulant layer, and the backsheet to form the mixture.

3. The method as claimed in claim 1, wherein the crystalline silicon particles have a particle size of 0.0001 mm to 1 mm.

4. The method as claimed in claim 1, wherein the encapsulant comprises ethylene vinyl acetate copolymer, thermoplastic polyolefin, polyvinyl butyral, or a combination thereof.

5. The method as claimed in claim 1, wherein the backsheet material comprises polyethylene terephthalate, polyvinyl fluoride, polyvinylidene fluoride, polyamide, ethylene vinyl acetate copolymer, tetrafluoroethylene-hexafluoropropylene-vinylidene fluoride terpolymer, ethylene chlorotrifluoroethylene copolymer, polyethylene or a combination thereof.

6. The method as claimed in claim 1, wherein the step of compounding the mixture further comprises:
adding 1 to 100 parts by weight of an engineering plastic, 0.1 to 30 parts by weight of an additive agent, or a combination thereof to the mixture, wherein the engineering plastic is different from the encapsulant, and the engineering plastic is different from the backsheet material.

7. The method as claimed in claim 6, wherein the engineering plastic comprises polycarbonate, polypropylene, polyethylene terephthalate, polybutylene terephthalate, nylon, acrylonitrile-butadiene-styrene copolymer, polyethylene, polyimide, polyether ether ketone, polyoxymethylene, polymethyl methacrylate, thermoplastic rubber elastomer, or a combination thereof.

8. The method as claimed in claim 6, wherein the additive agent comprises conductive additive agent, modifier, lubricant, antioxidant, thermal stabilizer, reinforcing agent, or a combination thereof.

9. The method as claimed in claim 8, wherein the conductive additive agent comprises metal powder, metal fiber, conductive carbon black, conductive carbon fiber, graphene, carbon nanotube, or a combination thereof.

10. An antistatic plastic, comprising:
10 parts by weight of crystalline silicon particles;
1 to 30 parts by weight of an encapsulant; and
0.5 to 25 parts by weight of a backsheet material,
wherein the encapsulant is different from the backsheet material,
wherein the antistatic plastic is in the form of a plate, and the plate has a surface resistivity of $10^6$ ohm/sq to $10^{14}$ ohm/sq.

11. The antistatic plastic as claimed in claim 10, wherein the crystalline silicon particles have a particle size of 0.0001 mm to 1 mm.

12. The antistatic plastic as claimed in claim 10, wherein the encapsulant comprises ethylene vinyl acetate copolymer, thermoplastic polyolefin, polyvinyl butyral, or a combination thereof.

13. The antistatic plastic as claimed in claim 10, wherein the backsheet material comprises polyethylene terephthalate, polyvinyl fluoride, polyvinylidene fluoride, polyamide, ethylene vinyl acetate copolymer, tetrafluoroethylene-hexafluoropropylene-vinylidene fluoride terpolymer, ethylene chlorotrifluoroethylene copolymer, polyethylene, or a combination thereof.

14. The antistatic plastic as claimed in claim 10, further comprising 1 to 100 parts by weight of an engineering plastic, 0.1 to 30 parts by weight of an additive agent, or a combination thereof, wherein the engineering plastic is different from the encapsulant, and the engineering plastic is different from the backsheet material.

15. The antistatic plastic as claimed in claim 14, wherein the engineering plastic comprises polycarbonate, polypropylene, polyethylene terephthalate, polybutylene terephthalate, nylon, acrylonitrile-butadiene-styrene copolymer, polyethylene, polyimide, polyether ether ketone, polyoxymethylene, polymethyl methacrylate, thermoplastic rubber elastomer, or a combination thereof.

16. The antistatic plastic as claimed in claim 14, wherein the additive agent comprises conductive additive agent, modifier, lubricant, antioxidant, thermal stabilizer, reinforcing agent, or a combination thereof.

17. The antistatic plastic as claimed in claim 16, wherein the conductive additive agent comprises metal powder, metal fiber, conductive carbon black, conductive carbon fiber, graphene, carbon nanotube, or a combination thereof.

* * * * *